April 22, 1969  N. COMMINS  3,439,771
APPARATUS FOR PREVENTING THEFT OF A VEHICLE
Filed Oct. 4, 1967

INVENTOR.
Noel Commins
BY
ATTORNEY

United States Patent Office 3,439,771
Patented Apr. 22, 1969

3,439,771
APPARATUS FOR PREVENTING THEFT
OF A VEHICLE
Noel Commins, 5 Dutch Court,
West Nyack, N.Y. 10994
Filed Oct. 4, 1967, Ser. No. 672,777
Int. Cl. B60r 25/00; H02j 3/00
U.S. Cl. 180—114                                    7 Claims

ABSTRACT OF THE DISCLOSURE

An apparatus for preventing the theft of a vehicle of the type having an ignition switch for selectively connecting and disconnecting an ignition coil with a battery which includes a first relay for connecting the distributor with the ignition coil when the relay is energized and for grounding the distributor when the relay is de-energized. A second relay is provided for automatically de-energizing the first relay when the ignition switch is operated to the ignition coil disconnect position to prevent energization of the vehicle ignition system thereby to eliminate unauthorized use of the vehicle.

---

Figure 1:
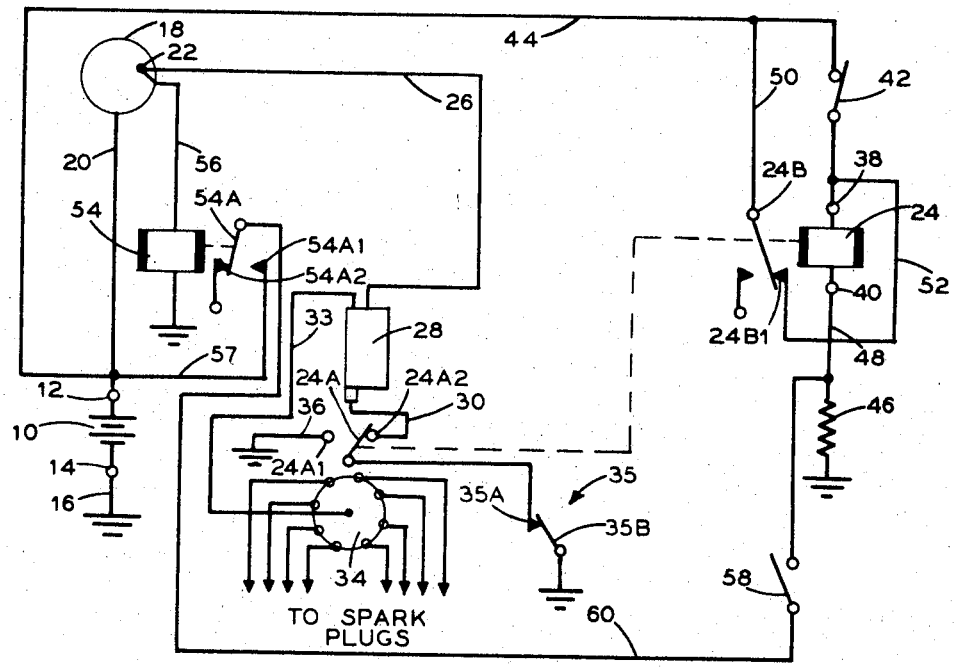

This invention relates generally to an apparatus for preventing the theft of a vehicle, and, more particularly, pertains to an apparatus which automatically prevents operation of the ignition system of a vehicle when the ignition switch of the vehicle is operated to the off-position.

Many devices have been proposed in the past to prevent theft of unauthorized use of a vehicle having a conventional ignition system. For example, one such device utilizes a relay which is operated to ground the lead connecting the ignition coil with the distributor of the vehicle when the ignition switch is operated to the on-position by unauthorized personnel. The relay is adapted to be energized in response to the opening of the door of the vehicle. However, a major drawback associated with this type of device resides in the fact that the relay can be operated when the motor is running. Thus, if an authorized operator momentarily opens the door of the vehicle for any reason, the distributor lead will be grounded and the vehicle will stall. This can be extremely disconcerting, particularly when the operator only wishes to allow the vehicle to warm-up on cold days and he does not wish to remain in the vehicle during this warm-up period.

Accordingly, an object of this invention is to provide a vehicle theft preventing apparatus which is operable only when the ignition switch is in the off-position to prevent stalling of the vehicle due to accidental operation of the apparatus.

Another object of this invention is to provide an apparatus for preventing theft of the vehicle which is compatible for use in existing vehicles and is installed easily in such vehicles.

A further object and feature of the present invention resides in the novel details of construction which provide an apparatus of the type described wherein the operation of the apparatus is always under the control of the operator.

Another object of the present invention is to provide a theft prevention apparatus for a vehicle which is reliable in operation.

In furtherance of the above objects, the apparatus of the present invention is adapted to be utilized in a vehicle of the type having a two-terminal source of potential having one terminal grounded, an ignition coil, an ignition switch for connecting the ignition coil with the ungrounded source of potential when the ignition switch is in the first position and for disconnecting the ignition coil from the source of potential when the ignition switch is in a second position and a distributor. The apparatus comprises a two-terminal connecting means adapted to connect the distributor with the ignition coil when it is energized and to disconnect the distributor from the ignition coil when the connecting means is de-energized. A first switch means is adapted to connect and disconnect one terminal of the connecting means to the ungrounded terminal of the source of potential and lead means is provided for connecting the other terminal of the connecting means to ground. A second switch means is also connected to the other terminal of the connecting means and is operable, when the ignition switch is in the second position, to connect the other terminal of the connecting means to the ungrounded terminal of the source of potential to de-energize the connecting means.

Figure 2:
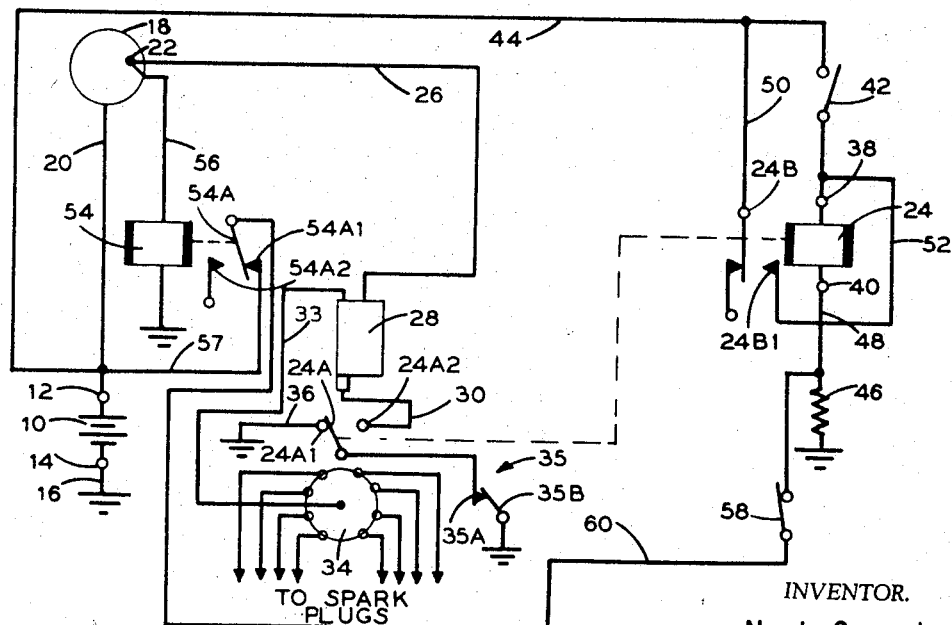

Other features and advantages of the present invention will become more apparent from a consideration of the following detailed description when taken in conjunction with the accompanying drawing, in which:

FIG. 1 is a schematic circuit wiring diagram of an apparatus constructed according to the present invention, illustrating the connection of the elements when they are in the energized state; and FIG. 2 is a schematic circuit wiring diagram similar to FIG. 1, illustrating the circuit connections when the circuit elements are in the de-energized state.

As noted hereinabove, the apparatus of the present invention is adapted to be utilized in a conventional ignition system in a motor-operated vehicle. Thus, only those portions of the ignition system which are required for an understanding of the present invention will be described herein.

Accordingly, the conventional ignition system of a vehicle includes a battery 10 having a first terminal 12 and a second terminal 14. The terminal 14 of the battery is connected to ground by a lead 16. The terminal 12 of the battery is connected to an ignition switch 18 by a lead 20. The ignition switch 18 is operable between an on-position or a first state for connecting the lead 20 with a terminal 22 in the ignition switch thereby to connect the battery 10 with the terminal 22 and an off-position or a second state to disconnect the lead 20 from the terminal 22.

The terminal 22 of the ignition switch 18 is connected directly to one side of the primary winding of an ignition coil 28 of the ignition system by a lead 26. The other side of the primary winding of the ignition coil 28 is connected to a contact 24A₂ of a relay 24 by a lead 30. A relay armature 24A, which is normally biased into engagement with a grounded relay contact 24A₁ is adapted to engage the contact 24A₂ when the winding of the relay 24 is energized. The armature 24A is connected to one contact 35A of a pair of contacts 35 which comprise the points of a distributor 34. The other contact 35B is grounded. The operation of the points 35 is conventional. That is, the contacts 35A and 35B continuously open and close to product a high voltage across the secondary winding of the ignition coil 28.

The secondary winding of the ignition coil 28 is connected to the rotor of the distributor 34 by a lead 33. As is conventional with ignition systems, the distributor 34 is provided with a plurality of contacts which are respectively connected to the individual spark plugs of the motor of the vehicle. The contact 24A₁ is connected to ground by a lead 36.

The winding of the relay 24 is provided with terminals 38 and 40. The terminal 38 is connected to the terminal 12 of the battery 10 through a normally open switch 42 by a lead 44. The terminal 40 of the relay winding 24 is connected to ground, through a resistor 46, by a lead 48. A holding circuit which includes an armature 24B and associated contact 24B₁ of the relay 24 is adapted to be established about the relay winding 24 to maintain the same energized. More particularly, the armature 24B is connected to the terminal 12 of the battery 10 by a lead 50 and the lead 44. The contact 24B₁, which is adapted to be engaged by the armature 24B when the relay winding 24 is energized, is connected to the terminal 38 of the relay winding by a lead 52.

The apparatus of the present invention also includes means for automatically de-energizing the relay winding 24 when the ignition switch 18 is moved to the off-position or second state. More specifically, a relay 54 is provided which is connected between the terminal 22 of the ignition switch 18 and ground by a lead 56. The relay 54 includes an armature 54A which is normally biased into engagement with a contact 54A₁ when the winding of the relay 54 is de-energized and which is adapted to engage an unconnected contact 54A₂ when the winding of the relay 54 is energized. The contact 54A₁ is connected to the terminal 12 of the battery 10 by a lead 57. The armature 54A of the relay 54 is connected to the terminal 40 of the relay 24, through a normally open single-pole single-throw switch 58 by a lead 60.

The switch 58, as noted above, is normally in the open position. Additionally, the switch 58 is adapted to be operated to the closed position when the door of the vehicle is opened. To be more specific, the switch 58 is operatively positioned with respect to the door of the vehicle and it is normally biased to the open position. However, when the door of the vehicle is opened, as when the driver exits from the vehicle, the switch is automatically moved to the closed position thereby connecting the armature 54A with the terminal 40 of the relay 24.

The operation of the apparatus of the invention may best be understood by referring first to FIG. 2 which illustrates the circuit connections when the apparatus is in the de-energized state. Accordingly, it is to be noted that the distributor contact 35A is connected to ground through the lead 36, the armature 24A and the contact 24A₁ of the relay 24. Moreover, the switch 42 is in the open position. It should be noted that the switch 42 is to be located behind the dashboard of the vehicle so that it cannot be seen by anyone entering the vehicle. When an authorized operator wishes to start the vehicle, he enters the vehicle and closes the door behind him. This action opens the switch 58 in the manner noted hereinabove. Thereafter, the operator momentarily closes the switch 42 thereby energizing the relay winding 24 through the lead 44 which is connected to the battery 10. Accordingly, the armatures 24A and 24B of the relay 24 engage the respective contacts 24A and 24B₁, as shown in FIG. 1. Thus, the distributor contact 35A of the points 35 will now be connected to the ignition coil 28 through the lead 30, armature 24A and contact 24A₂. Additionally, a holding circuit will be established about the winding of the relay 24 through the leads 44 and 50, the armature 24B and contact 24B₁ and the lead 52 to the terminal 38 of the relay winding 24. At this point, the switch 42 may be operated to the open position and the relay winding 24 will remain energized.

After the relay 24 has been energized, the operator of the vehicle may then operate the ignition switch 18 in the conventional manner to connect the battery 10 to the terminal 22 of the ignition switch thereby to start the vehicle by applying the potential of the battery to the ignition coil 28. When the ignition switch is moved to the on-position, the winding of the relay 54 will be energized through the lead 56 and ground. Hence, the armature 54A will engage the unconnected contact 54A₂ of the relay 54 thereby to prevent de-energization of the relay 24 while the motor of the vehicle is operating.

When the operator of the vehicle stops the car and leaves the same, the theft prevention apparatus of the present invention automatically grounds the distributor contact 35A, in the manner indicated below, to render the automobile inoperative to prevent theft of the car. To be more specific, when the operator moves the ignition switch 18 to the off-position, the winding of the relay 54 will be de-energized. Accordingly, the armature 54A will engage the contact 54A₁ thereby connecting the lead 60 with the terminal 12 of the battery 10 through a lead 57. However, since the switch 58 is still open at this time, the battery 10 will not be connected to the terminal 40 of the relay winding 24. The relay winding 24 will remain energized through the holding circuit which includes the lead 50 and the armature 24B of the relay. However, when the operator opens the door of the vehicle, switch 58 is automatically closed thereby to connect the terminal 40 of the relay winding 24 to the terminal 12 of the battery. It will now be obvious that both the terminals 38 and 40 of the relay winding 24 will be connected to the terminal 12 of the battery 10. Thus, current will cease to flow through the relay winding and the relay 24 will release the armatures 24A and 24B. The armature 24A will engage the contact 24A₁ to again connect the distributor contact 35A to ground. Thus, when the contact 35A is grounded the primary winding of the ignition coil 28 will be open-circuited. Hence, the coil will not produce the high voltage for the spark plugs. Moreover, the armature 24B will be disconnected from the contact 24B₁ thereby to break the holding circuit about the relay winding 24. Hence, the respective armatures of the relays will assume the positions shown in FIG. 2.

When the operator wishes to start the vehicle again, he simply closes the switch 42 and the above procedure is repeated. If any unauthorized personnel attempt to start the vehicle while the relay 24 is de-energized and the switch 42 is open, it will be obvious that no power will be applied to the distributor 34 even though the ignition switch 18 is operated to the on-position or first state. Since the switch 42 is placed in a location such that it is not readily observable, as behind the dashboard of the vehicle, the thief will not be able to start the vehicle. Additionally, since the distributor contact 35A is grounded, it will be obvious that the ignition system will remain inoperative even though a thief may attempt to by-pass the ignition switch 18 with a "jumper" wire. That is, even if a wire is connected directly to the input terminal of ignition coil no power will be applied to the distributor rotor.

Accordingly, an apparatus has been described for preventing the theft of a vehicle which is operable to automatically disconnect the ignition coil of the vehicle from the ignition switch and to ground the same to prevent unauthorized use of the vehicle.

What is claimed is:

1. Apparatus for preventing theft of a vehicle of the type having a two-terminal source of potential having one terminal grounded, a distributor having a set of contacts, an ignition coil, and an ignition switch for connecting the ignition coil with the ungrounded terminal of the source of potential when the ignition switch is in a first position and for disconnecting the ignition coil from the undergrounded terminal of the source of potential when the ignition switch is in a second position; said apparatus comprising a two-terminal connecting means adapted to connect the distributor contacts with the ignition coil when energized and to disconnect the distributor contacts from the ignition coil when de-energized, first switch means adapted to selectively connect and disconnect one terminal of said connecting means to the ungrounded terminal of the source of potential, lead means for connecting the other terminal of said connecting means to ground, and second switch means connected to said other terminal of said connecting means and being operable when the ignition switch is in the second position to connect said other terminal of said connecting means to the ungrounded terminal of said source of potential to de-energize said connecting means.

2. Apparatus as in claim 1, wherein said connecting means is operable to connect the distributor contacts to ground when said connecting means is de-energized.

3. Apparatus as in claim 1, in which said second switch means includes a single-pole single-throw switch operatively associated with a door of the vehicle, whereby said single-pole single-throw switch is operated to the closed position when the door of the vehicle is opened to connect said other terminal of said connecting means to the ungrounded terminal of the source of potential.

4. Apparatus as in claim 3, wherein said second switch means further comprises electro-mechanical means connected between said single-pole single-throw switch and the ungrounded terminal of the source of potential, said electro-mechanical means being adapted to normally connect said single-pole single-throw switch to the ungrounded terminal of the source of potential, said electro-mechanical means being responsive to the operation of the ignition switch to the first position to disconnect said single-pole single-throw switch from the ungrounded terminal of the source of potential.

5. An apparatus as in claim 1, in which said connecting means comprises a relay having at least one armature movable between a pair of contacts, said armature being connected to the distributor contacts of the vehicle, one of said relay contacts being connected to the ignition coil of the vehicle, the other of said relay contacts being connected to ground, whereby said armature normally engages said grounded relay contact and it moves to engage the relay contact connected to the ignition coil when said relay is energized.

6. An apparatus as in claim 5, in which said first switch means comprises a switch normally biased to the open position, said first switch being serially connected between said one terminal of said relay and the ungrounded terminal of the source to selectively connect the relay with the ungrounded terminal of the source of potential and to disconnect said relay from the ungrounded terminal of the source of potential.

7. Apparatus as in claim 6, in which said relay includes a second armature and an associated contact connected between said one terminal of said relay and the ungrounded terminal of the source of potential, said second armature being adapted to engage the associated contact to connect said relay directly with the ungrounded terminal of the source of potential to maintain a holding circuit about said relay while said relay is energized.

References Cited

UNITED STATES PATENTS

| | | | |
|---|---|---|---|
| 2,016,494 | 10/1935 | Hayes | 180—82 |
| 2,327,558 | 8/1943 | Reavis | 307—10 X |
| 2,515,044 | 7/1950 | Kappel | 307—10 X |
| 2,708,005 | 5/1955 | Gazzo | 180—101 |
| 2,820,149 | 1/1958 | Roth | 307—10 |
| 3,010,531 | 11/1961 | Flora | 180—114 |
| 3,158,749 | 11/1964 | McAllister | 307—10 |
| 3,160,761 | 12/1964 | Fuller | 307—10 |
| 3,186,508 | 6/1965 | Lamont. | |
| 3,194,970 | 7/1965 | Claps | 307—10 |

KENNETH H. BETTS, *Primary Examiner.*

U.S. Cl. X.R.

307—10